United States Patent
Shih et al.

(10) Patent No.: US 9,395,840 B2
(45) Date of Patent: Jul. 19, 2016

(54) ELECTRONIC DEVICE AND TOUCH PANEL FOR SAME

(71) Applicant: Shih Hua Technology Ltd., Zhubei, Hsinchu County (TW)

(72) Inventors: Po-Sheng Shih, Hsinchu (TW); Chien-Yung Cheng, Hsinchu (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 221 days.

(21) Appl. No.: 13/853,068

(22) Filed: Mar. 29, 2013

(65) Prior Publication Data

US 2013/0257773 A1    Oct. 3, 2013

(30) Foreign Application Priority Data

Mar. 30, 2012    (TW) .............................. 101111503 A

(51) Int. Cl.
*G09G 5/00*    (2006.01)
*G06F 3/041*    (2006.01)
*G06F 3/044*    (2006.01)

(52) U.S. Cl.
CPC .............. *G06F 3/0416* (2013.01); *G06F 3/044* (2013.01); *G06F 2203/04107* (2013.01)

(58) Field of Classification Search
CPC . G06F 3/0488; G06F 3/04883; G06F 3/0344; G09G 2330/04; H01L 27/0808; H01L 27/0814

USPC .............................. 345/173–178; 361/56, 111
See application file for complete search history.

(56) References Cited

U.S. PATENT DOCUMENTS

| | | | | |
|---|---|---|---|---|
| 5,506,375 A | * | 4/1996 | Kikuchi | ...................... 178/18.07 |
| 2009/0262094 A1 | * | 10/2009 | Lin | ................................ 345/174 |
| 2011/0316803 A1 | * | 12/2011 | Kim | ................................ 345/173 |
| 2012/0002335 A1 | * | 1/2012 | Tang | ................................ 361/56 |
| 2013/0038542 A1 | * | 2/2013 | Kim | ................................ 345/173 |

FOREIGN PATENT DOCUMENTS

| CN | 102314254 | 1/2012 |
|---|---|---|
| CN | 102315629 | 1/2012 |

* cited by examiner

*Primary Examiner* — Jennifer Nguyen
(74) *Attorney, Agent, or Firm* — ScienBiziP, P.C.

(57) ABSTRACT

An electronic device includes a shell and a touch panel located in the shell. The touch panel includes a touch sensing unit, a signal transmitting circuit, a signal guiding circuit, a protection unit, and a driving unit. The signal transmitting circuit is electrically connected to the touch sensing unit and the driving unit. The signal guiding circuit surrounds the touch sensing unit and the signal transmitting circuit. The protection unit is electrically connected to the signal guiding circuit and ground. At least one switch signal is outputted from the driving unit and transmitted to the signal transmitting circuit and the signal guiding circuit. An external interference signal is received by the signal guiding circuit and guided to ground via the protection unit.

14 Claims, 6 Drawing Sheets

ELECTRONIC DEVICE AND TOUCH PANEL FOR SAME

BACKGROUND

1. Technical Field

The disclosure relates to an electronic device and a touch panel.

2. Description of Related Art

In touch panels, the signal for determining a touch may be susceptible to interference by static electricity or other signals which reduces the quality of the touch-sensitivity of the touch panel.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various embodiments of the present disclosure in detail, wherein like numerals refer to like elements throughout.

Figure 1:
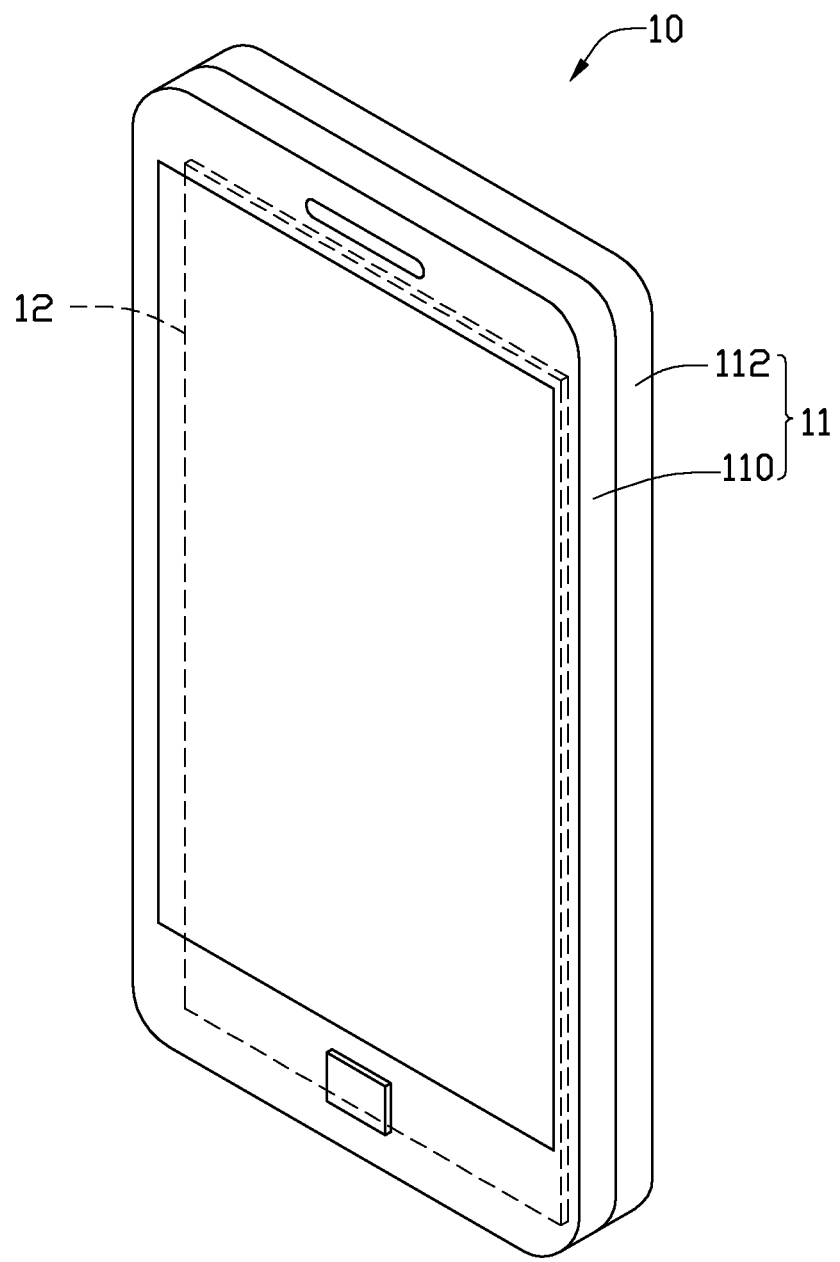
FIG. 1 is a schematic diagram showing one embodiment of an electronic device.

FIG. 1 shows one embodiment of an electronic device 10. The electronic device 10 includes a shell 11 and a touch panel 12 located in the shell 11. The electronic device can be a mobile communication device with touch function. In the embodiment, the shell 11 consists of a cover 110 and a bottom 112.

Figure 2:
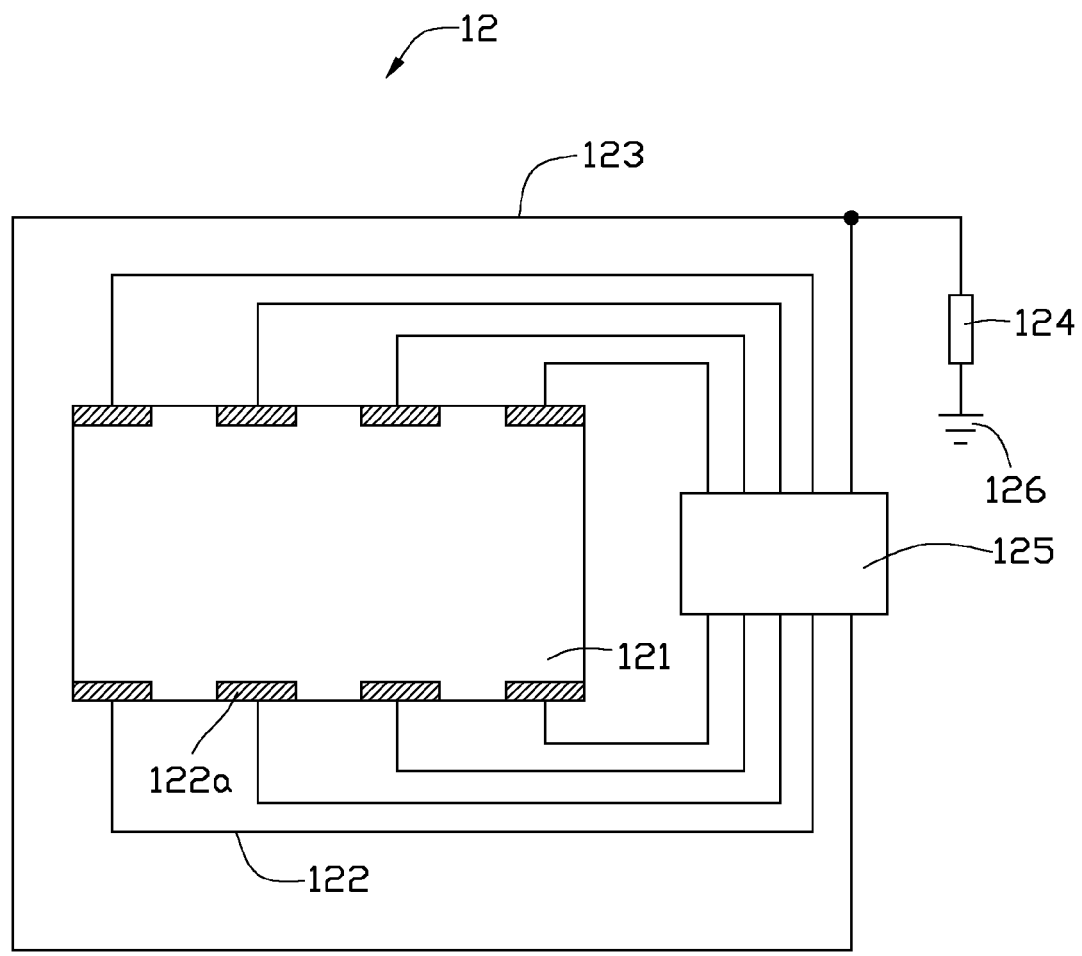
FIG. 2 is a schematic diagram showing a touch panel of the electronic device of FIG. 1.

FIG. 2 shows that the touch panel 12 includes a touch sensing unit 121, a signal transmitting circuit 122, a signal guiding circuit 123, a protection unit 124, and a driving unit 125. The touch panel 12 can be a capacitive, resistance, or an optical type touch panel.

The touch sensing unit 121 may include a conductive film, a conductive glass, or an optical element, such as an infrared transceiver.

The signal transmitting circuit 122 is electrically connected to the touch sensing unit 121 and the driving unit 125. The signal guiding circuit 123 surrounds the signal transmitting circuit and electrically connected to the driving unit 125. The signal transmitting circuit 122 and the signal guiding circuit 123 can be a printed circuit that is located or formed on the substrate.

In one embodiment, the impedance of the signal guiding circuit 123 is smaller than the impedance of the signal transmitting circuit 122. The line width of the signal guiding circuit 123 is greater than the line width of the signal transmitting circuit 122 to reduce the impedance. In the circuit, electrons will be passed via a low impedance path, most of the external interference signal than can be easily guided by the signal guiding circuit 123 directed to the protection unit 124.

In addition, the material of the signal guiding circuit 123 can be a low impedance material, for example, copper, silver, or graphene.

The signal transmitting circuit 122 further includes a plurality of electrodes 122a in contact with the touch sensing unit 121. Its detailed description will be described hereinafter.

The protection unit 124 is electrically connected to the signal guiding circuit 123 and ground 126. The external interference signal is guided to ground via the protection unit 124 to avoid external interference signal affecting the functionality of the touch panel. The protection unit 124 may include at least one high-level trigger element, which can be an overvoltage protection element. The overvoltage protection element is such as a zener diode, a transient voltage suppressor (TVS), a varistor, or a multilayer varistor. These components will be turned on if the signal level on the circuit has a factory preset level.

Figure 3A:
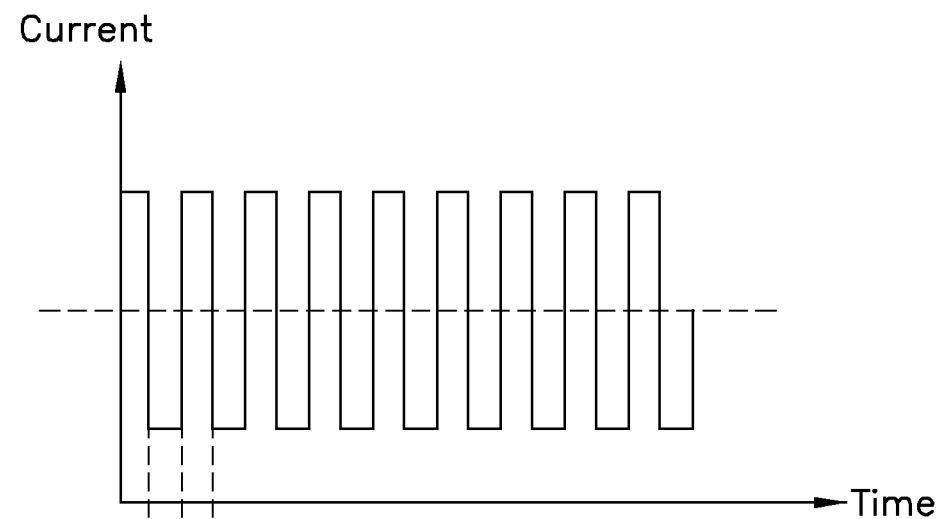
FIGS. 3A and 3B are schematic diagrams showing signal output by a driving unit.
Figure 3B:
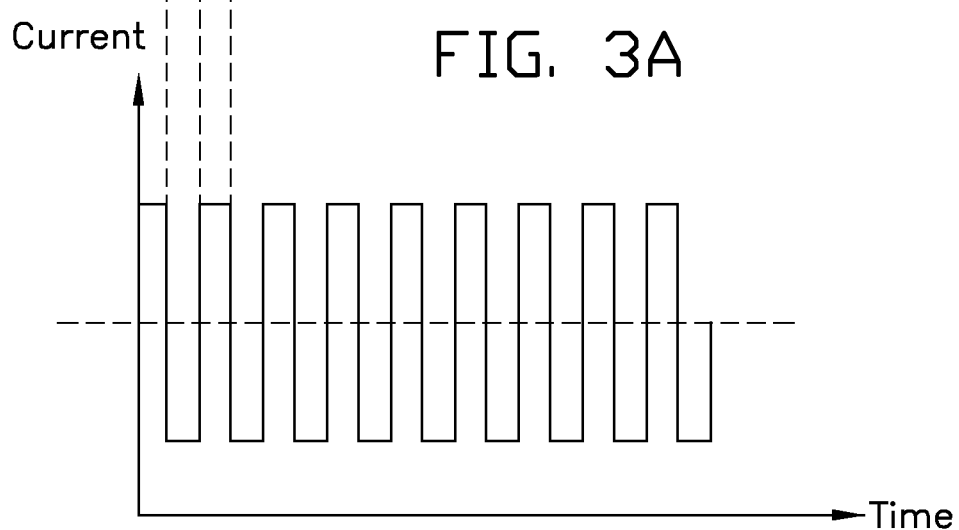

The driving unit 125 outputs at least one switching signal delivered to the signal transmitting circuit 122 and the signal guiding circuit 123. In the embodiment, the switching signal can be a pulse signal. The switching signal transmitted on the signal transmitting circuit 122 and the switching signal transmitted on the signal guiding circuit 123 are the signal with the similar phase and amplitude, that are showing in FIGS. 3A and 3B. The kind of switching signal can reduce the capacitance effect generated between the signal transmitting circuit 122 and the signal guiding circuit 123, thereby reducing the capacitive load of the signal transmitting circuit 122. The capacitive load reduction can also reduce the load on the driving unit 125, and thus save energy.

When the electronic device 10 is used close to the external interference signal (e.g., static electricity or high-level voltage), the external interference signal may enter into the electronic device 10 via the edge of the housing 11. In one embodiment, the signal guiding circuit 123 is located on the periphery of the signal transmitting circuit 122 and the touch sensing unit 121. The signal guiding circuit 123 guides most of the external interfering signal to the ground via the protection unit 124 to eliminate external interference signals causing functional impact of the electronic device 10.

In general, the external interference signal is a high-level signal which can turn on the protection unit 124 and be guided to ground 126 via the protection unit 124 when the external interference signal is received by the signal guiding circuit 123.

Figure 4:
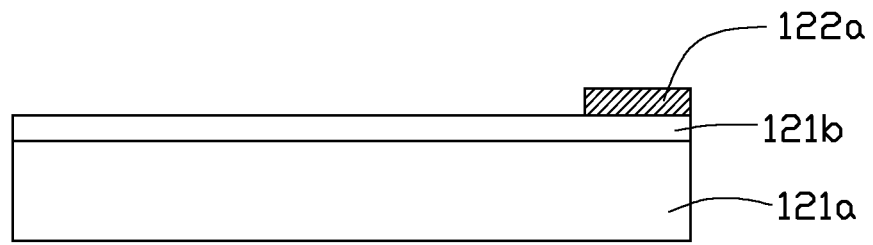
FIG. 4 is a cross-sectional diagram of a surface capacitive touch panel of FIG. 2.
Figure 5A:
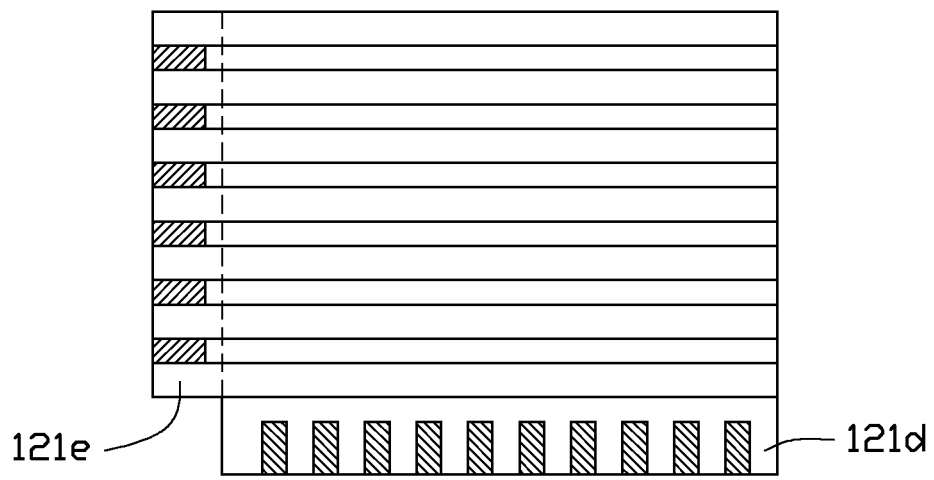
FIGS. 5A and 5B are schematic diagrams showing another embodiment of a touch panel of the electronic device.
Figure 5B:
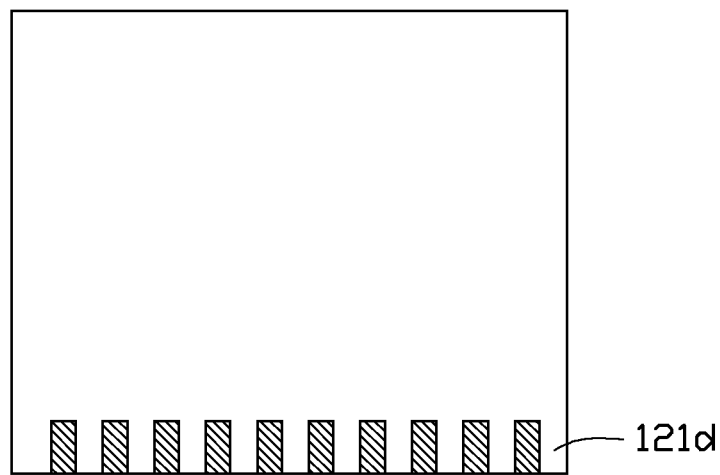
Figure 5B:
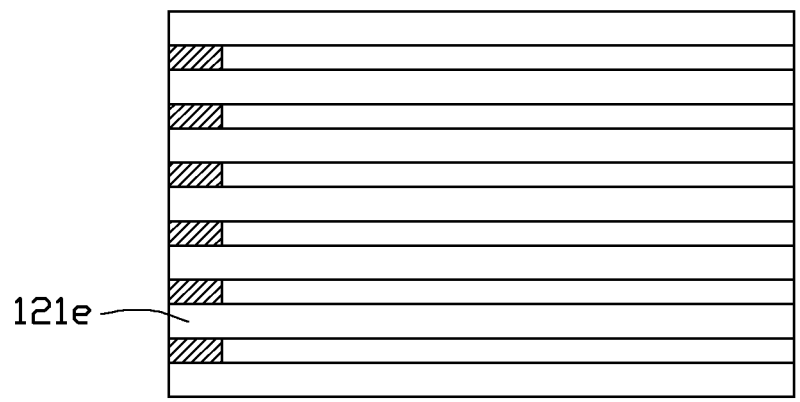

In one embodiment, the touch sensing unit 121 is a capacitive touch sensing unit and includes structural characteristics as shown in FIGS. 4, 5A and 5B.

FIG. 4 shows a cross-sectional diagram of a surface capacitive touch panel of FIG. 2. Referring to FIGS. 2 and 4, the surface capacitive touch panel includes a substrate 121a and a conductive thin film 121b located on the substrate 121a. The substrate 121a may be glass or a flexible substrate. The conductive film 121b has anisotropic impedance, which means that the conductive film 121b has a different impedance characteristic in two different directions, a low impedance direction and a high impedance direction. In the embodiment, the direction of the low impedance and high impedance direction are substantially perpendicular to each other.

The conductive film 121b includes a carbon nanotube (CNT) film. The manufacturing process of the CNT films begins with forming the carbon nanotubes first. The carbon nanotubes are pulled one by one according to well known stretching technologies. Further substantially parallel alignment of conductive structures can occur because the front end and the back end of each carbon nanotube are attracted to each other due to van der Waals force. The impedance of the CNT films in the stretched direction is less than the impedance substantially perpendicular to the stretched direction, thereby forming an anisotropic impedance characteristic. The CNTs are pulled out and adhered to the substrate 121a by a light-curing adhesive to form the CNT film.

FIG. 2 shows that the electrode 122a is located on two opposite sides of the conductive film 121b along the high impedance direction. A signal input to the conductive film 121b or received from the conductive film 121b of each electrode 122a is transmitted along the low impedance direction.

FIGS. 5A and 5B are the structural diagrams showing another touch sensing unit of a touch panel of the embodiment.

FIG. 5A is a top view of a projected capacitive touch panel. FIG. 5B is an exploded view of the projected capacitive touch panel. The projected capacitive touch panel includes a first conductive film 121d and a second conductive film 121e, wherein the first conductive film 121d has a low impedance direction and a high impedance direction, thus the first conductive film 121d has anisotropic impedance.

The second conductive film 121e includes a patterned plurality of conductive structures substantially parallel and separated from each other by a preset distance. The conducting direction of the conductive structures of the second conductive film 121e is substantially perpendicular to the low impedance direction of the first conductive film 121d. In the embodiment, the second conductive film 121e can be a patterned indium tin oxide (ITO) film.

An insulating layer (not shown) is located between the first conductive film 121d and the second conductive film 121e, whereby the three elements constitute a capacitor structure.

The electrodes located on the first conductive film 121d and the second conductive film 121e can be electrically connected to the same driving unit, or electrically connected to a different driving unit. In addition, the signal guiding circuit (not shown) is located around the touch sensing unit and the signal transmitting circuit.

In summary, the signal guiding circuit is located on a peripheral of the touch sensing unit and the signal transmitting circuit, and the similar signals are provided to the signal guiding circuit and the signal transmitting unit to reduce the generation of capacitive loading effect. In addition, the external interference signal is guided to the protection unit via the signal guiding circuit to avoid external interference signal affect the functionality of the touch panel.

Even though numerous characteristics and advantages of certain embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A touch panel comprising a touch sensing unit, a signal transmitting circuit, a driving unit, a signal guiding circuit surrounding the signal transmitting circuit and the touch sensing unit and electrically connected to the driving unit, and a protection unit electrically connected to the signal guiding circuit and ground, wherein an external interference signal is received by the signal guiding circuit and guided to ground via the protection unit, wherein a switching signal is output by the driving unit and transmitted to the signal transmitting circuit and the signal guiding circuit.

2. The touch panel of claim 1, wherein the external interference signal is static electricity or high-level voltage.

3. The touch panel of claim 1, wherein the protection unit comprises a high-level trigger.

4. The touch panel of claim 3, wherein the high-level trigger is an overvoltage protection element.

5. The touch panel of claim 4, wherein the overvoltage protection element is a zener diode, a transient voltage suppressor, a varistor, or a multilayer varistor.

6. The touch panel of claim 1, wherein an impedance of the signal guiding circuit is less than or equal to an impedance of the signal transmitting circuit.

7. The touch panel of claim 1, wherein a line width of the signal guiding circuit is greater than or equal to a line width of the signal transmitting circuit.

8. An electronic device comprising a shell and a touch panel located in the shell, the touch panel comprising a touch sensing unit, a signal transmitting circuit, a driving unit, a signal guiding circuit surrounding the signal transmitting circuit and the touch sensing unit, and electrically connected to the driving unit, and a protection unit electrically connected to the signal guiding circuit and a ground, wherein an external interference signal is received by the signal guiding circuit and guided to the ground via the protection unit, wherein a switching signal is output by the driving unit and transmitted to the signal transmitting circuit and the signal guiding circuit.

9. The electronic device of claim 8, wherein the external interference signal is static electricity or high-level voltage.

10. The electronic device of claim 8, wherein the protection unit comprises a high-level trigger.

11. The electronic device of claim 10, wherein the high-level trigger is an overvoltage protection element.

12. The electronic device of claim 11, wherein the overvoltage protection element is a zener diode, a transient voltage suppressor, a varistor, or a multilayer varistor.

13. The electronic device of claim 8, wherein an impedance of the signal guiding circuit is less than or equal to an impedance of the signal transmitting circuit.

14. The electronic device of claim 8, wherein a line width of the signal guiding circuit is greater than or equal to a line width of the signal transmitting circuit.

\* \* \* \* \*